United States Patent
Yun et al.

(10) Patent No.: US 11,286,003 B2
(45) Date of Patent: Mar. 29, 2022

(54) VEHICLE BODY STRUCTURE

(71) Applicants: Hyundai Motor Company, Seoul (KR); Kia Motors Corporation, Seoul (KR); Hanwha Solutions Corporation, Seoul (KR)

(72) Inventors: Hyun Cheol Yun, Seoul (KR); Do Wan Lim, Sejong-si (KR)

(73) Assignees: Hyundai Motor Company, Seoul (KR); Kia Motors Corporation, Seoul (KR); Hanwha Solutions Cornoration, Seoul (KR)

( * ) Notice: Subject to any disclaimer, the term of this patent is extended or adjusted under 35 U.S.C. 154(b) by 0 days.

(21) Appl. No.: 16/989,326

(22) Filed: Aug. 10, 2020

(65) Prior Publication Data

US 2021/0171116 A1    Jun. 10, 2021

(30) Foreign Application Priority Data

Dec. 5, 2019  (KR) ........................ 10-2019-0160989

(51) Int. Cl.
| B62D 23/00 | (2006.01) |
| B62D 25/06 | (2006.01) |
| B62D 27/02 | (2006.01) |
| B62D 27/06 | (2006.01) |

(52) U.S. Cl.
CPC ........... *B62D 23/005* (2013.01); *B62D 25/06* (2013.01); *B62D 27/02* (2013.01); *B62D 27/023* (2013.01); *B62D 27/06* (2013.01)

(58) Field of Classification Search
CPC ........ B62D 24/00; B62D 25/02; B62D 25/06; B62D 27/02; B62D 27/023; B62D 23/005; B62D 31/003

USPC .................................... 296/205, 210, 29, 30
See application file for complete search history.

(56) References Cited

U.S. PATENT DOCUMENTS

| 5,332,281 | A | 7/1994 | Janotik et al. |
| 6,695,368 | B1 | 2/2004 | Weykamp et al. |
| 6,926,350 | B2 | 8/2005 | Gabbianelli et al. |
| 7,758,107 | B2 | 7/2010 | Ratsos et al. |
| 9,505,293 | B2 * | 11/2016 | Bowles .................. B60R 21/13 |
| 9,849,920 | B2 * | 12/2017 | Kawata ................ B62D 25/087 |
| 10,618,489 | B2 * | 4/2020 | Hisamura ............ B62D 27/065 |
| 2001/0000119 | A1 | 4/2001 | Jaekel et al. |
| 2006/0192375 | A1 | 8/2006 | Davis et al. |
| 2009/0121106 | A1 | 5/2009 | An |
| 2013/0277137 | A1 | 10/2013 | Kawaguchi et al. |
| 2021/0171125 | A1 | 6/2021 | Yong et al. |

FOREIGN PATENT DOCUMENTS

| DE | 102005026791 A1 | 1/2007 |
| EP | 1329374 A1 | 7/2003 |
| FR | 2822431 A1 | 9/2002 |
| JP | H0411581 A | 1/1992 |
| JP | 2013208968 A | 10/2013 |
| KR | 100243584 B1 | 3/2000 |
| KR | 20090035148 A | 4/2009 |
| WO | 2010071664 A1 | 6/2010 |

* cited by examiner

*Primary Examiner* — Dennis H Pedder
(74) *Attorney, Agent, or Firm* — Slater Matsil, LLP

(57) ABSTRACT

A vehicle body structure includes a space frame, a roof side bracket fastened to a roof side part of the space frame, a roof matching part provided on an upper side of the roof side bracket, and a roof panel, wherein a lower side of the roof panel is supported by the roof matching part.

20 Claims, 10 Drawing Sheets

+

VEHICLE BODY STRUCTURE

CROSS-REFERENCE TO RELATED APPLICATIONS

This application claims priority to Korean Patent Application No. 10-2019-0160989, filed on Dec. 5, 2019, which application is hereby incorporated herein by reference.

TECHNICAL FIELD

The present disclosure relates to a vehicle body structure.

BACKGROUND

Recently, development of vehicles, such as micro electric vehicles, has been expanded, and in order to meet diverse consumer needs, it is preferable that the body of such a micro electric vehicle has a structure suitable to the small quantity batch production.

The foregoing description of the background technology is intended merely to help the understanding of the background of the present disclosure, and is not intended to mean that the present disclosure falls within the purview of the related art that is already known to those of ordinary skill in the art.

SUMMARY

The present disclosure relates to a vehicle body structure. Particular embodiments relate to a technology of an outer panel combination structure of a vehicle body based on a space frame.

The present disclosure is proposed to solve problems, and an embodiment of the present disclosure provides a vehicle body structure capable of securing relatively light weight and high stiffness using a space frame, enabling a small quantity batch production sharing the space frame to be performed by highly securing the degree of freedom of the design of an outer panel that is mounted on the space frame to form an external appearance, and securing a sealing performance for effectively blocking an external noise or moisture intrusion.

A vehicle body structure according to embodiments of the present disclosure may include a space frame, a roof side bracket fastened to a roof side part of the space frame, a roof matching part provided on an upper side of the roof side bracket, and a roof panel combined in a state where a lower side of the roof panel is supported by the roof matching part.

The roof side bracket may include a base part connected to a lower side of the roof matching part and being in surface contact with an upper side surface of the roof side part of the space frame, and a plurality of reinforcement ribs may be formed between the roof matching part and the base part to support the roof matching part with respect to the base part.

The roof side bracket may be provided with a lower part connected from the base part to a lower side of the roof side bracket and being in surface contact with a side surface of the roof side part.

The roof side bracket may be formed to have a cross-sectional structure in which the base part is connected from the roof matching part to a lower side of an inner side of a vehicle body, and the lower part is connected from the base part to a lower side of an outer side of the vehicle body.

The roof side bracket may be combined with the roof side part by a fastening element fastening to penetrate the roof side bracket and the roof side part of the space frame in order from at least one of the base part and the lower part.

The vehicle body structure may further include a side lower bracket combined with the roof side part of the space frame, and a side outer combined with the side lower bracket.

The side lower bracket may include a fixed part fixed in a lateral direction of the roof side part of the space frame, and a side matching part connected from the fixed part and combined to be in surface contact with an inner side surface of the side outer.

The side lower bracket may have a cross-sectional structure in which the side matching part is connected to the fixed part through a bending part bent from a lower side of the fixed part in a lateral direction of the vehicle body.

The bending part may be formed so that an upper side part of the bending part comes in close contact with a lower side surface of the roof side part of the space frame.

The fixed part of the side lower bracket may be combined with the roof side part of the space frame in a state where the fixed part overlaps the roof side bracket.

A plurality of side lower brackets may be mounted along a length direction of the roof side bracket.

The side outer may be combined to be in surface contact with the side matching part of the side lower bracket and the roof matching part of the roof side bracket, and the roof panel may be combined to be in surface contact with an upper side surface of the side outer on an upper side of the roof matching part.

The side outer may be combined with the roof matching part and the side matching part by glues.

According to embodiments of the present disclosure, it is possible to secure relatively light weight and high stiffness using the space frame, to perform the small quantity batch production sharing the space frame through highly securing of the degree of freedom of the design of the outer panel mounted on the space frame to form the external appearance, and to secure a sealing performance for effectively blocking an external noise or moisture intrusion.

BRIEF DESCRIPTION OF THE DRAWINGS

The above and other objects, features and advantages of embodiments of the present disclosure will be more clearly understood from the following detailed description taken in conjunction with the accompanying drawings, in which.

DETAILED DESCRIPTION OF ILLUSTRATIVE EMBODIMENTS

Figure 1:
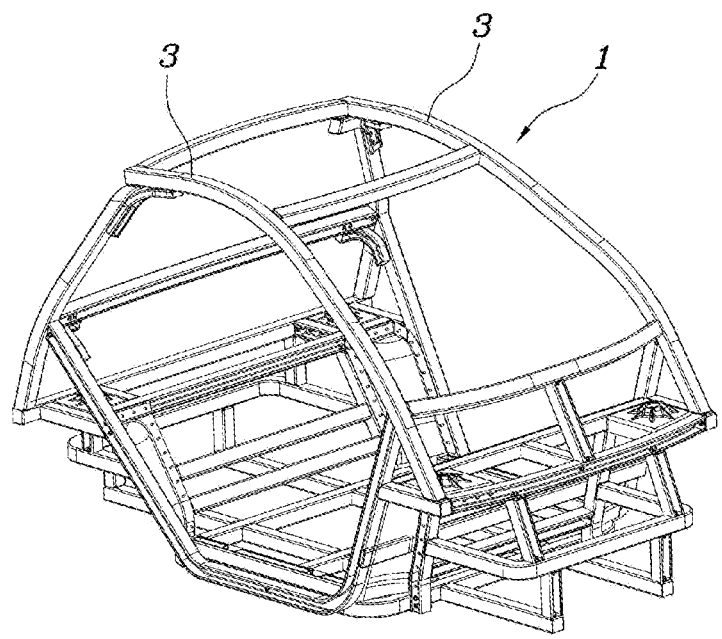
FIG. 1 is a view illustrating a vehicle body structure according to embodiments of the present disclosure including a space frame and a roof side bracket combined with the space frame.
Figure 1:
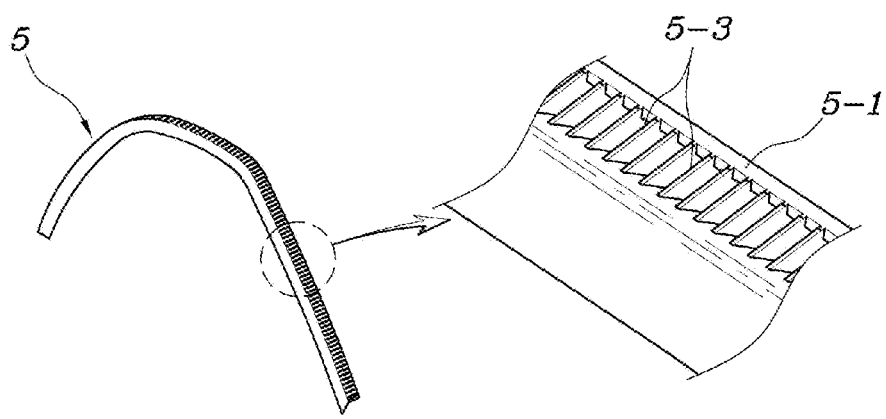

With reference to FIGS. 1 to 9, a vehicle body structure according to an embodiment of the present disclosure includes a space frame 1, a roof side bracket 5 fastened to a roof side part 3 of the space frame 1, a roof matching part 5-1 provided on an upper side of the roof side bracket 5, and a roof panel 7 combined in a state where a lower side of the roof panel is supported by the roof matching part 5-1.

According to this embodiment, the vehicle body structure further includes a side lower bracket 9 combined with the roof side part 3 of the space frame 1, and a side outer 11 combined with the side lower bracket 9.

That is, because the roof panel 7 is mounted on the space frame 1 that forms a frame of a vehicle body with a member, such as a pipe or a tube, using the roof side bracket 5, and the side outer 11 can be mounted thereon using the side lower bracket 9, the space frame 1 can be commonly used, and if the roof side bracket 5 and the side lower bracket 9 are modified, the roof having a design that is diversely changed and the side outer 11 can be easily assembled to enable vehicles having various designs to be produced more easily.

Here, the roof side part 3 of the space frame 1 means portions corresponding to regions supporting both edges of a front windshield glass, the roof, and a rear windshield glass in the vehicle body in the related art.

The roof side bracket 5 is configured to include a base part 5-2 connected to a lower side of the roof matching part 5-1 and being in surface contact with an upper side surface of the roof side part 3 of the space frame 1, and a plurality of reinforcement ribs 5-3 are formed between the roof matching part 5-1 and the base part 5-2 to support the roof matching part 5-1 with respect to the base part 5-2.

That is, the base part 5-2 and the roof matching part 5-1 of the roof side bracket 5 are spaced apart from each other in upper and lower directions, and the plurality of reinforcement ribs 5-3 are provided between the base part 5-2 and the roof matching part 5-1 to support the roof matching part 5-1 with respect to the base part 5-2.

Figure 10:
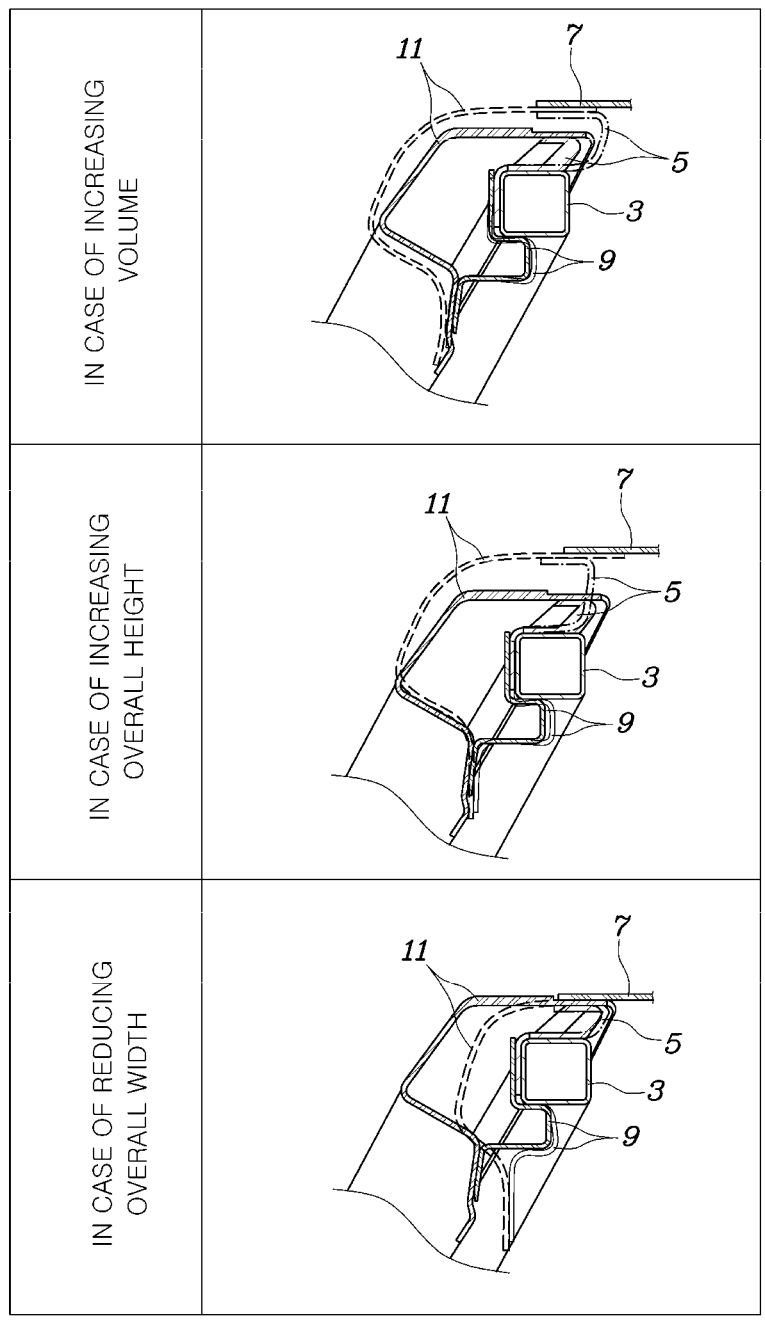
FIG. 10 is a diagram explaining various possible design changes of a vehicle body structure according to embodiments of the present disclosure.

As exemplified in FIG. 10, in the case of increasing or decreasing the vehicle volume or overall height, the change of the vehicle design as described above can be easily accommodated and the lower side of the roof panel 7 can be strongly supported by easily changing the relative position of the roof matching part 5-1 with respect to the base part 5-2.

Further, the roof side bracket 5 is provided with a lower part 5-4 connected from the base part 5-2 to the lower side thereof and being in surface contact with a side surface of the roof side part 3.

That is, the roof side bracket 5 is formed to have a cross-sectional structure in which the base part 5-2 is connected from the roof matching part 5-1 to a lower side of an inner side of the vehicle body, and the lower part 5-4 is connected from the base part 5-2 to a lower side of an outer side of the vehicle body.

The roof side bracket 5 may be easily and firmly combined with the roof side part 3 of the space frame 1 by the base part 5-2 and the lower part 5-4, and in such a firm assembly state, the roof side bracket 5 is provided with the roof matching part 5-1 on the upper side thereof, so that the roof combination structure through the roof matching part 5-1 can be firmly and easily secured.

In this embodiment, the roof side bracket 5 is combined with the roof side part 3 by a fastening element 13 fastening to penetrate the roof side bracket 5 and the roof side part 3 of the space frame 1 in order from at least one of the base part 5-2 and the lower part 5-4.

Figure 2:
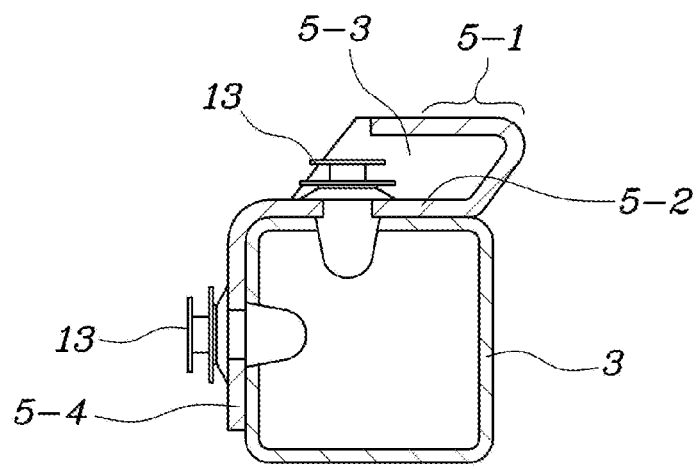
FIG. 2 is a view explaining a state where a roof side bracket is combined with a space frame of FIG. 1.
Figure 2:
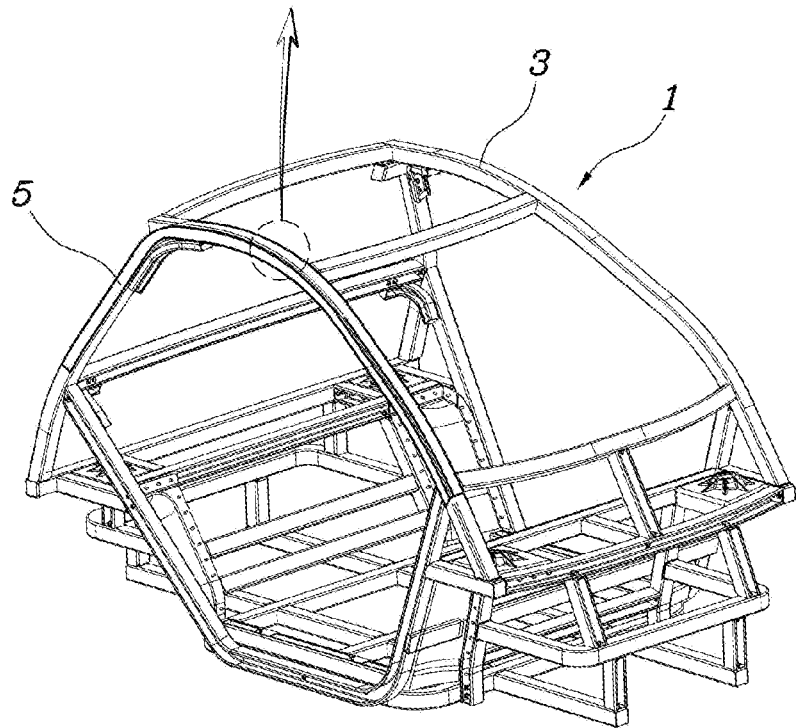
Figure 3:
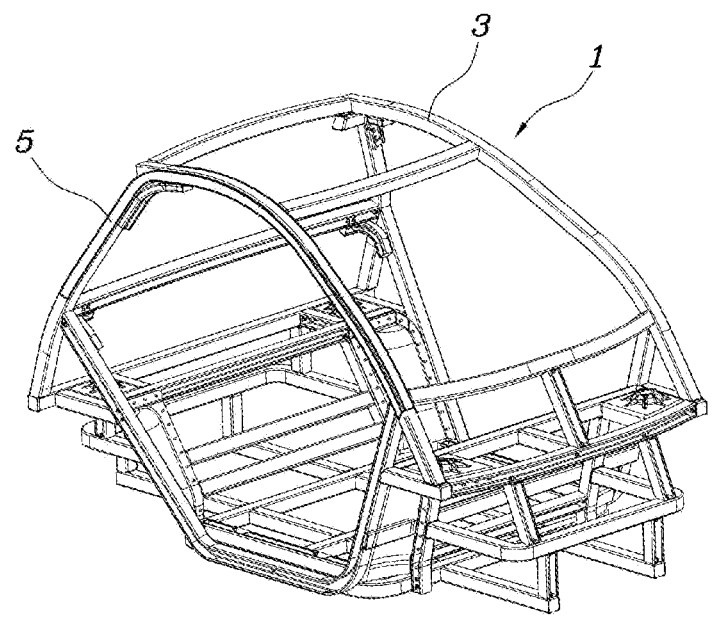
FIG. 3 is a view explaining a plurality of side lower brackets combined with the structure of FIG. 2.
Figure 3:
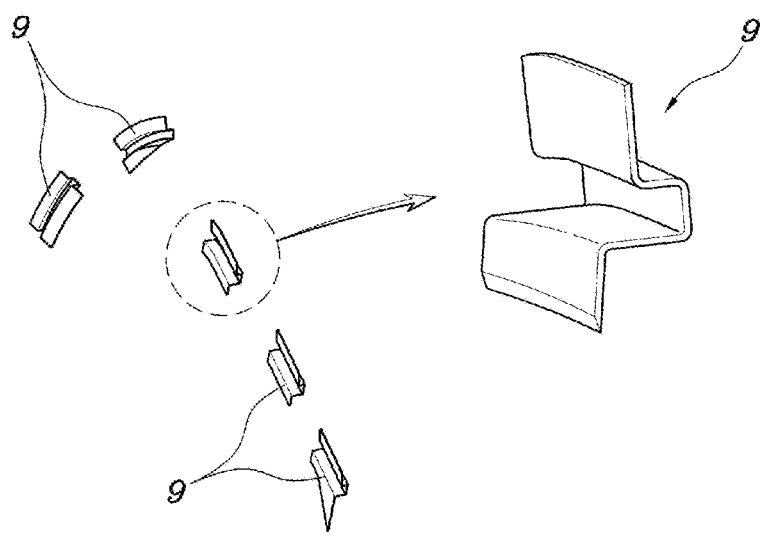

For reference, FIG. 2 illustrates a construction in which both the base part 5-2 and the lower part 5-4 are combined with the roof side part 3 of the space frame 1 through the fastening element 13.

Here, as the fastening element 13, a fastener, a screw, or a flow drill screw (FDS) may be used.

The side lower bracket 9 includes a fixed part 9-1 fixed in a lateral direction of the roof side part 3 of the space frame 1 and a side matching part 9-2 connected from the fixed part 9-1 and combined to be in surface contact with an inner side surface of the side outer 11.

That is, the side lower bracket 9 may make the side outer 11 fixed to the roof side part 3 of the space frame 1 through combination of the side outer 11 with the side matching part 9-2 in a state where the fixed part 9-1 is fixed to the roof side part 3.

In this embodiment, the side lower bracket 9 has a cross-sectional structure in which the side matching part 9-2 is connected to the fixed part 9-1 through a bending part 9-3 bent from a lower side of the fixed part 9-1 in a lateral direction of the vehicle body.

Figure 5:
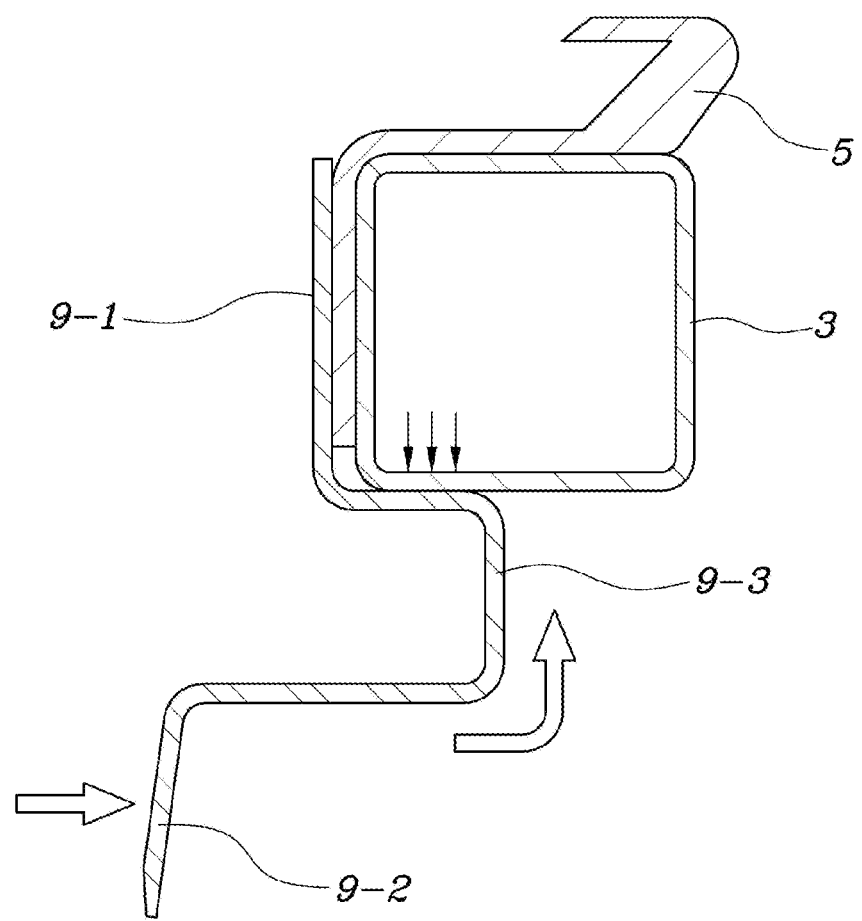
FIG. 5 is a view explaining the role of a bending part supporting a side lower bracket against an external force in a horizontal direction acting on the side lower bracket.

In particular, as illustrated in FIG. 5, the bending part 9-3 is formed so that an upper side part thereof comes in close contact with a lower side surface of the roof side part 3 of the space frame 1, and thus it can firmly support the lower side surface of the roof side part 3 of the space frame 1 through the bending part 9-3 against an external force in a horizontal direction that can be easily applied through the side outer 11.

Figure 4:
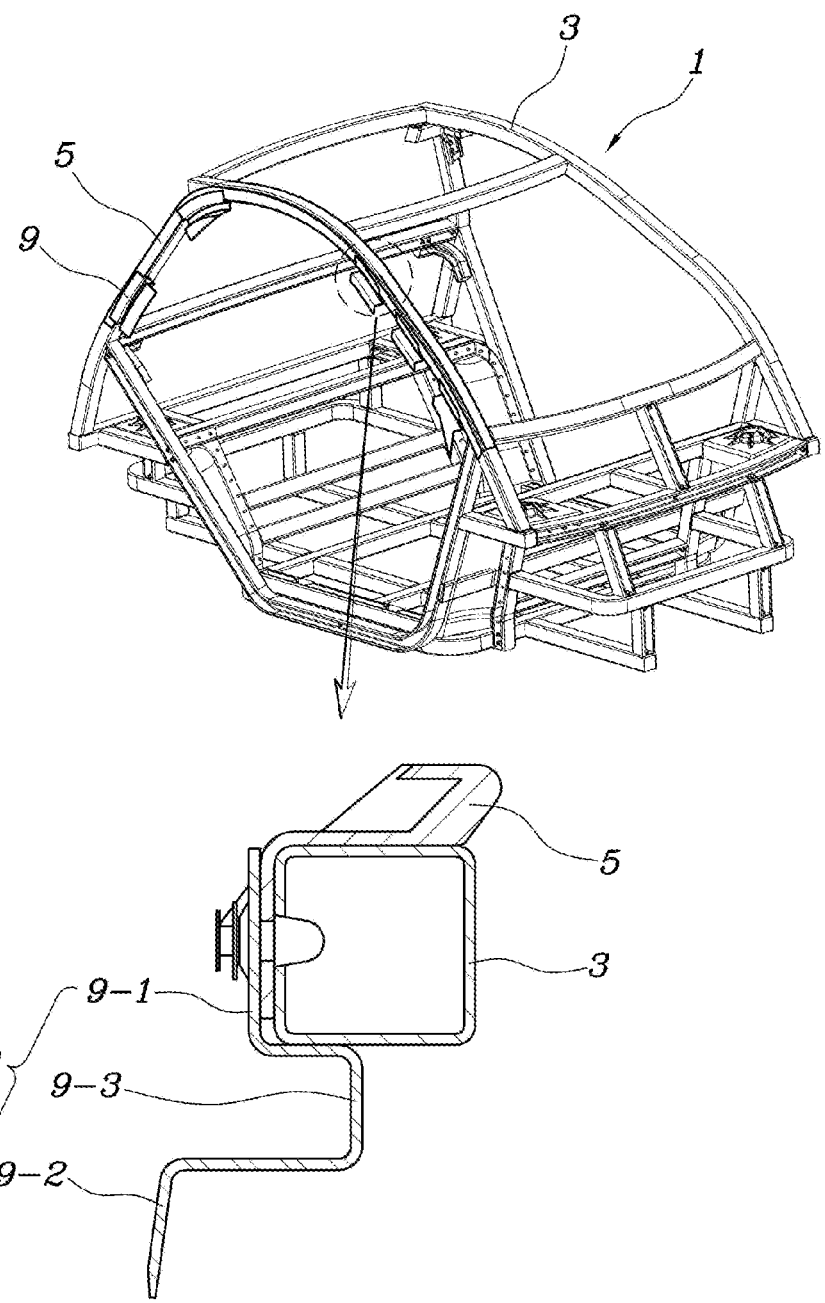
FIG. 4 is a view explaining a state where a plurality of side lower brackets are combined with the structure of FIG. 2.

As exemplified in FIGS. 4 and 5, the fixed part 9-1 of the side lower bracket 9 is combined with the roof side part 3 of the space frame 1 in a state where the fixed part 9-1 overlaps the roof side bracket 5, and in this case, the fastening element 13 may be combined with the roof side part 3 of the space frame 1 by penetrating the side lower bracket 9 and the roof side bracket 5 in order.

A plurality of side lower brackets 9 are mounted along a length direction of the roof side bracket 5.

That is, the number of side lower brackets 9 being mounted may be the number that is required to firmly fix the side outer 11 to the side surface of the space frame 1 in accordance with the size and the shape of the side outer 11. The respective side lower brackets 9 may be configured to have somewhat different shapes in accordance with mount regions of the side lower brackets 9, and thus they can more flexibly cope with the shape change of the side outer 11.

The side outer 11 is combined to be in surface contact with the side matching part 9-2 of the side lower bracket 9 and the roof matching part 5-1 of the roof side bracket 5, and the roof panel 7 is combined to be in surface contact with an upper side surface of the side outer 11 on the upper side of the roof matching part 5-1.

The side outer may be combined with the roof matching part and the side matching part by glues.

Figure 7:
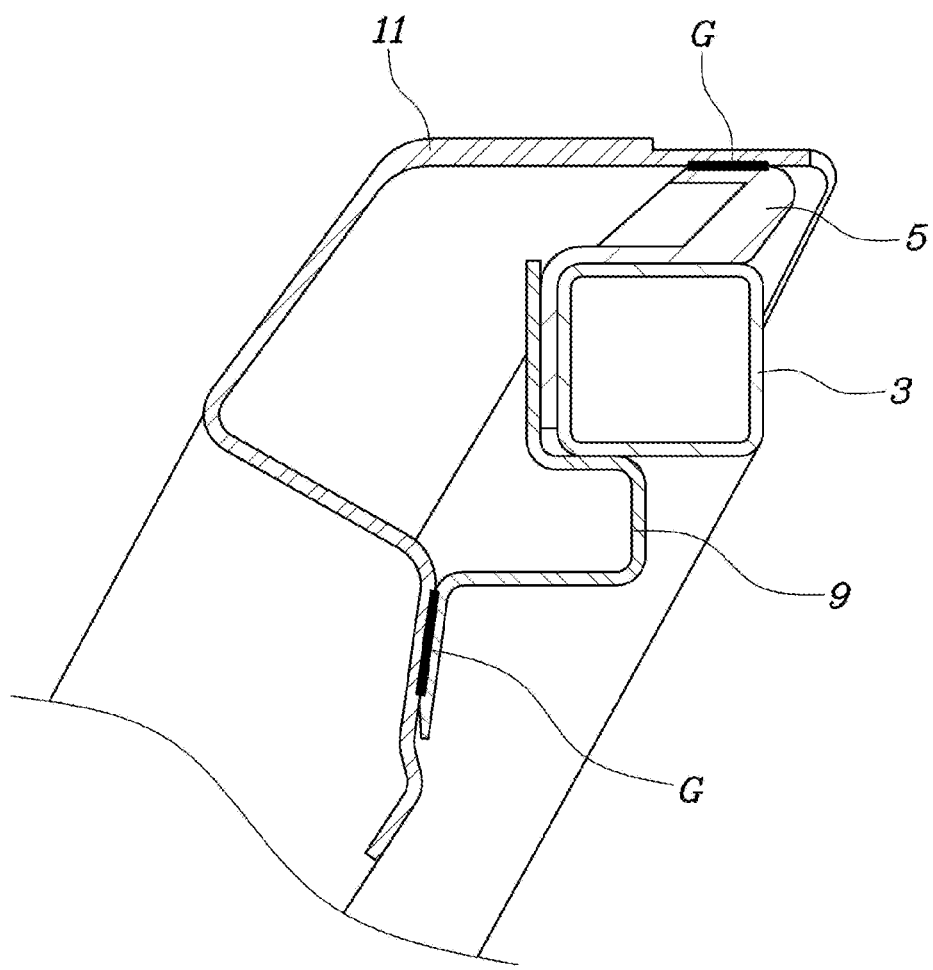
FIG. 7 is a cross-sectional view taken along line VII-VII of FIG. 6.

That is, as illustrated in FIG. 7, the side outer 11 forms an external appearance of the vehicle body from the side matching part 9-2 to the roof matching part 5-1, and it is combined to surround the interior thereof, and on the upper side of the roof matching part 5-1, the roof panel 7 is combined to overlap the upper side of the side outer 11. Accordingly, the surface of the vehicle body is completed by the roof panel 7 and the side outer 11, and thus a sealing structure is formed to prevent noise or moisture from intruding from an outer side of the roof panel 7 or the side outer 11.

In this embodiment, the side outer 11 is combined with the roof matching part 5-1 and the side matching part 9-2 by glues G to form a more reliable sealing structure.

Figure 6:
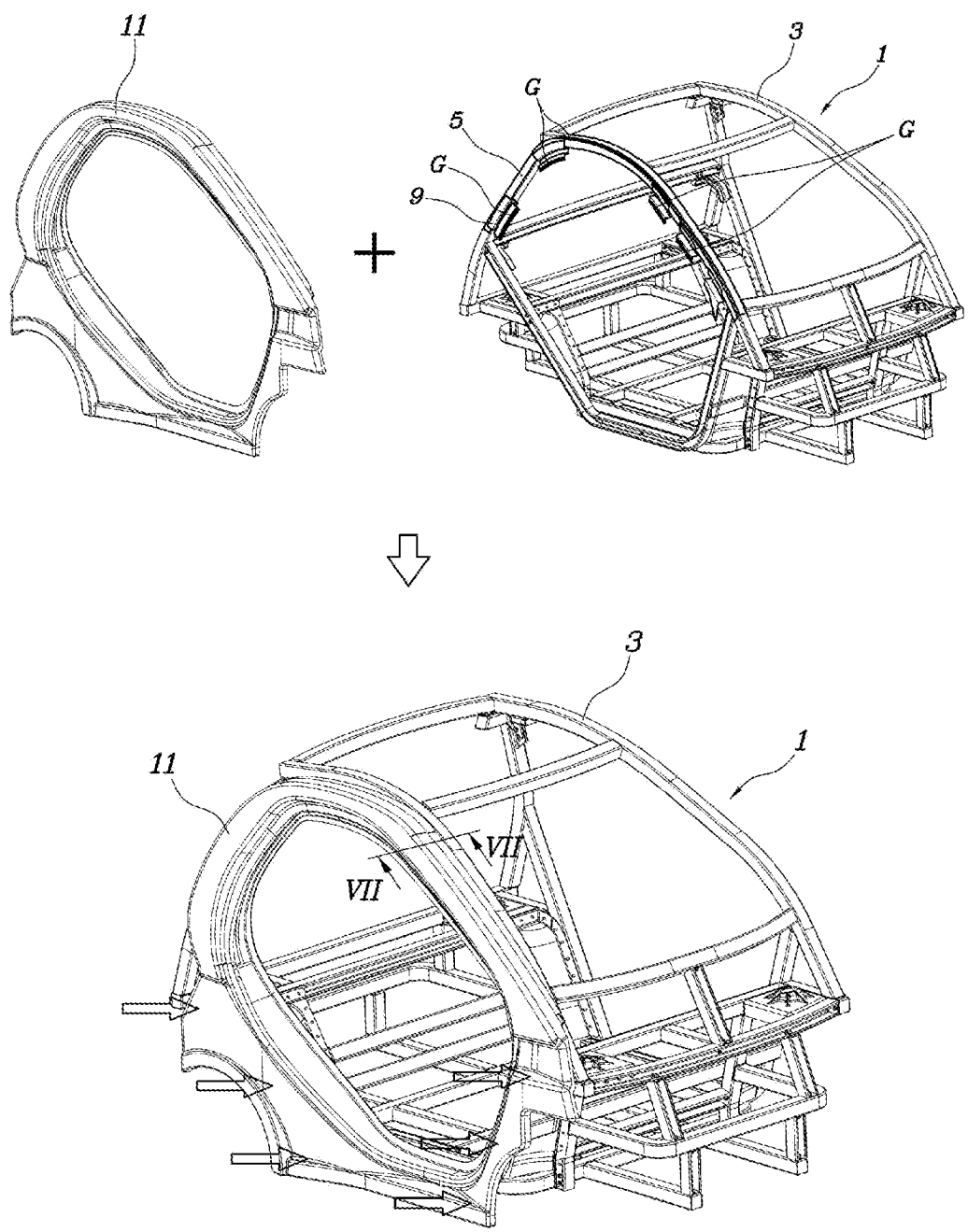
FIG. 6 is a view explaining a combination of a side outer with the structure of FIG. 4.

That is, as illustrated in FIG. 6, in a state where glues G are spread onto the side matching part 9-2 of the side lower bracket 9 and the roof matching part 5-1 of the roof side bracket 5, the side outer 11 may approach to be combined with the side matching part 9-2 and the roof matching part 5-1 by the glues G to secure a reliable sealing structure against moisture, such as rain water approaching from the upper side of the vehicle body.

Further, by combining the side outer 11 with the space frame 1 with a plurality of bolts by utilizing unexposed portions on the lower side of the side outer 11, a stronger assembly state of the side outer 11 can be embodied.

For reference, arrows illustrated on the lower side of FIG. 6 are to explain fastening of a plurality of bolts in order to combine the side outer 11 with the space frame 1 as described above.

Figure 8:
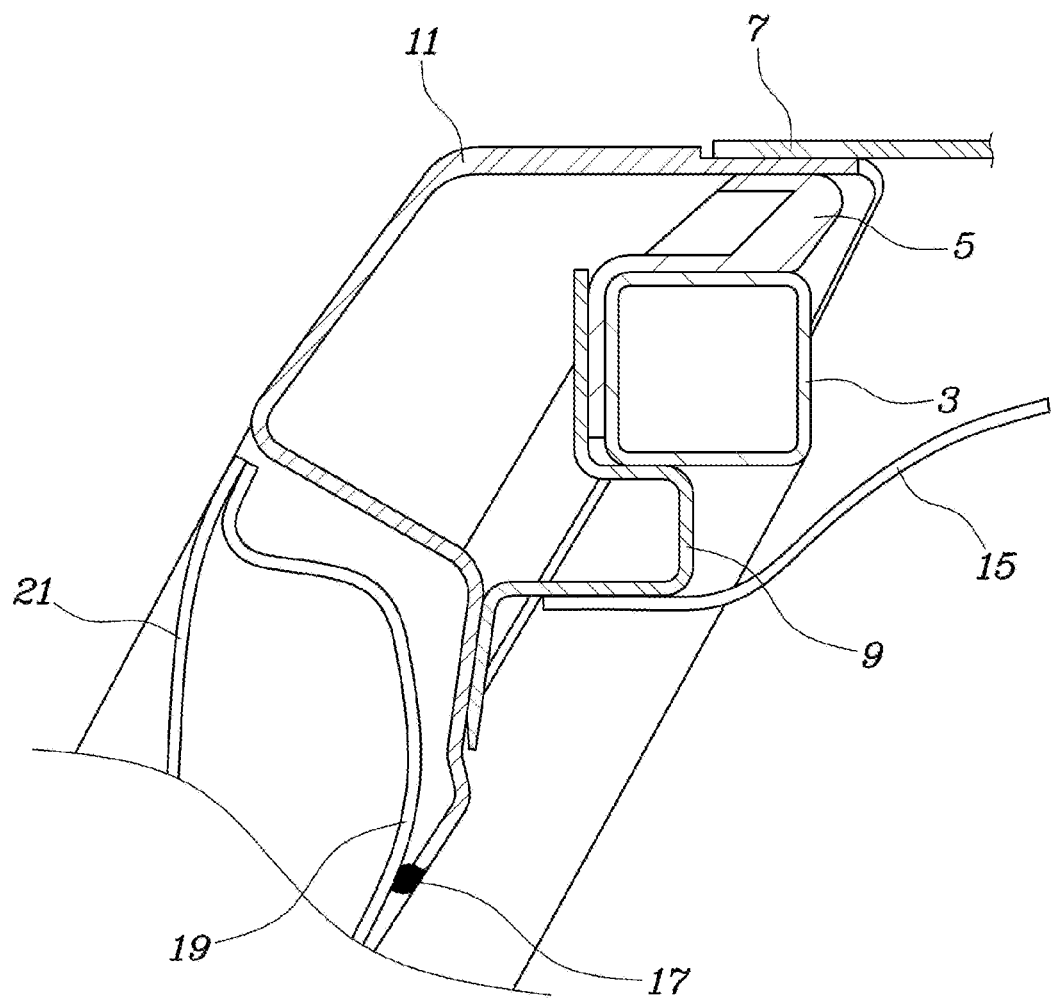
FIG. 8 is a view illustrating cross-sections of a roof panel and other components in addition to the cross-section of FIG. 7.
Figure 9:
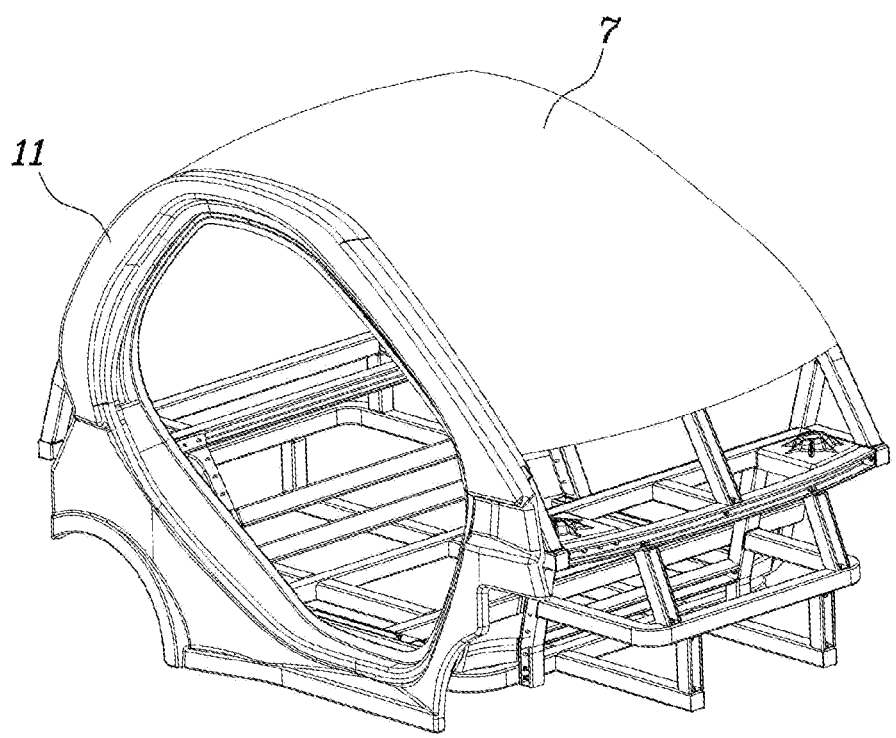
FIG. 9 is a view illustrating a state where a roof panel is mounted on the structure of FIG. 8.

For reference, FIG. 8 illustrates cross-sections of a roof panel 7 and other components in addition to the cross-section of FIG. 7. In FIG. 8, it is exemplified that a trim member 15 is mounted on the interior of the vehicle using the lower side of the bending part 9-3 of the side lower bracket 9, and a door weather strip 17 is mounted on a lower end portion of the side outer 11. In this case, a door that is composed of a door inner panel 19 and a door outer panel 21 may form the external appearance with the side outer 11, and it may be installed to be opened or closed while securing the sealing through the door weather strip 17.

FIG. 10 explains various possible design changes of a vehicle body structure according to embodiments of the present disclosure. In the case of increasing the volume of the vehicle body design, as indicated by dotted lines, the roof matching part 5-1 of the roof side bracket 5 is further spaced upward, and thus the side outer 11 is combined in a state where the cross-section of the side outer 11 is further expanded outward and upward. In the case of increasing the overall height of the vehicle body, as indicated by dotted lines, the roof matching part 5-1 of the roof side bracket 5 is further spaced upward, and thus the side outer 11 is combined in a state where the cross-section of the side outer 11 is further expanded upward. In the case of reducing the overall width of the vehicle body, the cross-section of the side outer 11 moves inward in a state where the side matching part 9-2 of the side lower bracket 9 further moves to the interior of the vehicle body, and thus the overall width can be decreased.

As described above, according to the vehicle body structure according to embodiments of the present disclosure, even if the height of the vehicle roof is changed or the shape of the side outer 11 is changed, due to simple shape changes of the roof side bracket 5 and the side lower bracket 9, the same space frame 1 can be commonly used, and a demand for a small quantity batch production can be effectively satisfied through providing of an easy firm assembly.

Further, easier vehicle body design changes can be sought by manufacturing the side outer 11 of plastic molds.

Although the preferred embodiments of the present disclosure have been illustrated and described for illustrative purposes, those of ordinary skill in the art will appreciate that various modifications, additions and substitutions are possible, without departing from the scope and spirit of the present disclosure as disclosed in the accompanying claims.

What is claimed is:

1. A vehicle body structure comprising:
a space frame;
a roof side bracket fastened to a roof side part of the space frame;
a roof matching part provided on an upper side of the roof side bracket;
a roof panel, wherein a lower side of the roof panel is supported by the roof matching part;
a side lower bracket attached to the roof side part of the space frame; and
a side outer attached to the side lower bracket.

2. A vehicle body structure comprising:
a space frame;
a roof side bracket fastened to a roof side part of the space frame;
a roof matching part provided on an upper side of the roof side bracket, wherein the roof side bracket comprises a base part connected to a lower side of the roof matching part and in surface contact with an upper side surface of the roof side part of the space frame;
a roof panel, wherein a lower side of the roof panel is supported by the roof matching part;
a side lower bracket attached to the roof side part of the space frame;
a side outer attached to the side lower bracket; and
a plurality of reinforcement ribs formed between the roof matching part and the base part, wherein the plurality of reinforcement ribs support the roof matching part with respect to the base part.

3. The vehicle body structure according to claim 2, wherein the roof side bracket comprises a lower part connected from the base part to a lower side of the roof side bracket and in surface contact with a side surface of the roof side part.

4. The vehicle body structure according to claim 3, wherein the roof side bracket is attached to the roof side part by a fastening element that penetrates the roof side bracket and the roof side part of the space frame in order starting from the base part or the lower part.

5. The vehicle body structure according to claim 1, wherein the side lower bracket comprises:
a fixed part fixed in a lateral direction of the roof side part of the space frame; and
a side matching part connected from the fixed part and in surface contact with an inner side surface of the side outer.

6. The vehicle body structure according to claim 5, wherein the side lower bracket has a cross-sectional structure in which the side matching part is connected to the fixed part through a bending part bent from a lower side of the fixed part in a lateral direction of the vehicle body structure.

7. The vehicle body structure according to claim 6, wherein the bending part is formed so that an upper side part of the bending part comes in close contact with a lower side surface of the roof side part of the space frame.

8. The vehicle body structure according to claim 5, wherein the fixed part of the side lower bracket is attached to the roof side part of the space frame, and wherein the fixed part overlaps the roof side bracket.

9. The vehicle body structure according to claim 8, wherein:

the side outer is in surface contact with the side matching part of the side lower bracket and the roof matching part of the roof side bracket; and the roof panel is in surface contact with an upper side surface of the side outer on an upper side of the roof matching part.

10. A vehicle comprising:
a vehicle body comprising a space frame;
a roof side bracket fastened to a roof side part of the space frame;
a roof matching part provided on an upper side of the roof side bracket;
a roof panel, wherein a lower side of the roof panel is supported by the roof matching part;
a side lower bracket attached to the roof side part of the space frame; and
a side outer attached to the side lower bracket.

11. The vehicle according to claim 10, wherein the roof side bracket comprises a base part connected to a lower side of the roof matching part and in surface contact with an upper side surface of the roof side part of the space frame, and the vehicle further comprises a plurality of reinforcement ribs formed between the roof matching part and the base part, wherein the plurality of reinforcement ribs support the roof matching part with respect to the base part.

12. The vehicle according to claim 11, wherein the roof side bracket comprises a lower part connected from the base part to a lower side of the roof side bracket and in surface contact with a side surface of the roof side part.

13. The vehicle according to claim 12, wherein the roof side bracket is attached to the roof side part by a fastening element that penetrates the roof side bracket and the roof side part of the space frame in order starting from the base part or the lower part.

14. The vehicle according to claim 10, wherein the side lower bracket comprises:
a fixed part fixed in a lateral direction of the roof side part of the space frame; and
a side matching part connected from the fixed part and in surface contact with an inner side surface of the side outer.

15. The vehicle according to claim 14, wherein the side lower bracket has a cross-sectional structure in which the side matching part is connected to the fixed part through a bending part bent from a lower side of the fixed part in a lateral direction of the vehicle body.

16. The vehicle according to claim 15, wherein the bending part is formed so that an upper side part of the bending part comes in close contact with a lower side surface of the roof side part of the space frame.

17. The vehicle according to claim 14, wherein the fixed part of the side lower bracket is attached to the roof side part of the space frame, and wherein the fixed part overlaps the roof side bracket.

18. The vehicle according to claim 17, wherein:
the side outer is in surface contact with the side matching part of the side lower bracket and the roof matching part of the roof side bracket; and
the roof panel is in surface contact with an upper side surface of the side outer on an upper side of the roof matching part.

19. The vehicle body structure according to claim 2, wherein the side lower bracket comprises:
a fixed part fixed in a lateral direction of the roof side part of the space frame; and
a side matching part connected from the fixed part and in surface contact with an inner side surface of the side outer.

20. The vehicle body structure according to claim 19, wherein the side lower bracket has a cross-sectional structure in which the side matching part is connected to the fixed part through a bending part bent from a lower side of the fixed part in a lateral direction of the vehicle body structure.

* * * * *

UNITED STATES PATENT AND TRADEMARK OFFICE
CERTIFICATE OF CORRECTION

| | |
|---|---|
| PATENT NO. | : 11,286,003 B2 |
| APPLICATION NO. | : 16/989326 |
| DATED | : March 29, 2022 |
| INVENTOR(S) | : Yun et al. |

It is certified that error appears in the above-identified patent and that said Letters Patent is hereby corrected as shown below:

On the Title Page

Item (73) Assignees; delete "Cornoration" and insert --Corporation--.

Signed and Sealed this
Seventeenth Day of May, 2022

Katherine Kelly Vidal
*Director of the United States Patent and Trademark Office*